(12) United States Patent
DeGiovine et al.

(10) Patent No.: US 12,443,810 B2
(45) Date of Patent: Oct. 14, 2025

(54) CAMERA-COMPATIBLE HANDLE ACCESSORY FOR MOBILE COMPUTING DEVICES

(71) Applicant: ZEBRA TECHNOLOGIES CORPORATION, Lincolnshire, IL (US)

(72) Inventors: Carl DeGiovine, Sayville, NY (US); Robert K. Liao, South Setauket, NY (US); JaeHo Choi, Whitestone, NY (US); Sunghun Lim, Bethpage, NY (US); Chandra M. Nair, Mount Sinai, NY (US); Jason H. Legoff, Miller Place, NY (US); Mu-Kai Shen, Taipei (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/317,430

(22) Filed: May 11, 2021

(65) Prior Publication Data

US 2022/0366164 A1 Nov. 17, 2022

(51) Int. Cl.
*G06K 7/10* (2006.01)
*H04N 23/69* (2023.01)

(52) U.S. Cl.
CPC ..... *G06K 7/10881* (2013.01); *G06K 7/10831* (2013.01); *H04N 23/69* (2023.01); *G06K 2207/1011* (2013.01)

(58) Field of Classification Search
CPC .................................................. G06K 7/10881

USPC ...................................................... 235/462.01
See application file for complete search history.

(56) References Cited

U.S. PATENT DOCUMENTS

| 5,736,726 | A  | 4/1998  | VanHorn et al. |
|-----------|----|---------|----------------|
| 6,708,887 | B1 | 3/2004  | Garrett et al. |
| D512,427  | S  | 12/2005 | Choi et al.    |
| 7,337,257 | B2 | 2/2008  | Landron et al. |
| D704,181  | S  | 5/2014  | Stevinson      |
| D787,510  | S  | 5/2017  | Kitade         |
| D823,852  | S  | 7/2018  | Shen et al.    |
| D852,187  | S  | 6/2019  | Kevin          |
| D909,384  | S  | 2/2021  | Malik et al.   |

(Continued)

OTHER PUBLICATIONS

RG630 UHF RFID Gun Grip, posted Nov. 16, 2020 [online], retrieved [Aug. 24, 2022]. Retrieved from internet, https://www.youtube.com/watch?v=d6uBzRDKLsM (Year: 2020).

(Continued)

*Primary Examiner* — Daniel A Hess

(57) ABSTRACT

An accessory for a mobile computing device having a camera with a field of view (FOV), includes: an adapter including: an inner wall having a first opening; a retention mechanism configured to releasably retain the mobile computing device against the inner wall with the camera positioned over the first opening; an outer wall joined to the inner wall by a set of side walls, the outer wall having a second opening with a second perimeter larger than a first perimeter of the first opening; a set of channel walls extending between the first perimeter of the first opening and the second perimeter of the second opening, the set of channel walls defining an open channel permitting the camera FOV to traverse the adapter substantially unobstructed; and a handle mount disposed on the outer wall.

16 Claims, 12 Drawing Sheets

(56) References Cited

U.S. PATENT DOCUMENTS

| | | |
|---|---|---|
| 2005/0087603 A1 | 4/2005 | Koenck et al. |
| 2010/0018006 A1 | 1/2010 | Mangaroo et al. |
| 2015/0126245 A1* | 5/2015 | Barkan ............. G06K 7/10881 |
| | | 455/556.1 |
| 2017/0092442 A1 | 3/2017 | Minafo et al. |
| 2017/0347000 A1* | 11/2017 | Perna .................. G06V 40/197 |
| 2020/0327290 A1 | 10/2020 | Ohori et al. |
| 2022/0334432 A1 | 10/2022 | Xu et al. |

OTHER PUBLICATIONS

The MC2200 and MC2700, Zebra's Latest Android Mobile Computer, posted Nov. 12, 2020 [online], retrieved [Aug. 24, 2022]. Retrieved from internet, https://www.youtube.com/watch?v=a67mm2wTK_c (Year: 2020).

* cited by examiner

CAMERA-COMPATIBLE HANDLE ACCESSORY FOR MOBILE COMPUTING DEVICES

BACKGROUND

Mobile computing devices can be employed in a wide variety of environments. In some environments, such as transport and logistics facilities or other inventory-handling roles, mobile computing devices can be deployed as barcode readers. To facilitate use as a barcode reader, a mobile computing device may be affixed to an accessory with a handle equipped with a trigger to activate a barcode reader module of the device. The accessory may, however prevent the use of other device functions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
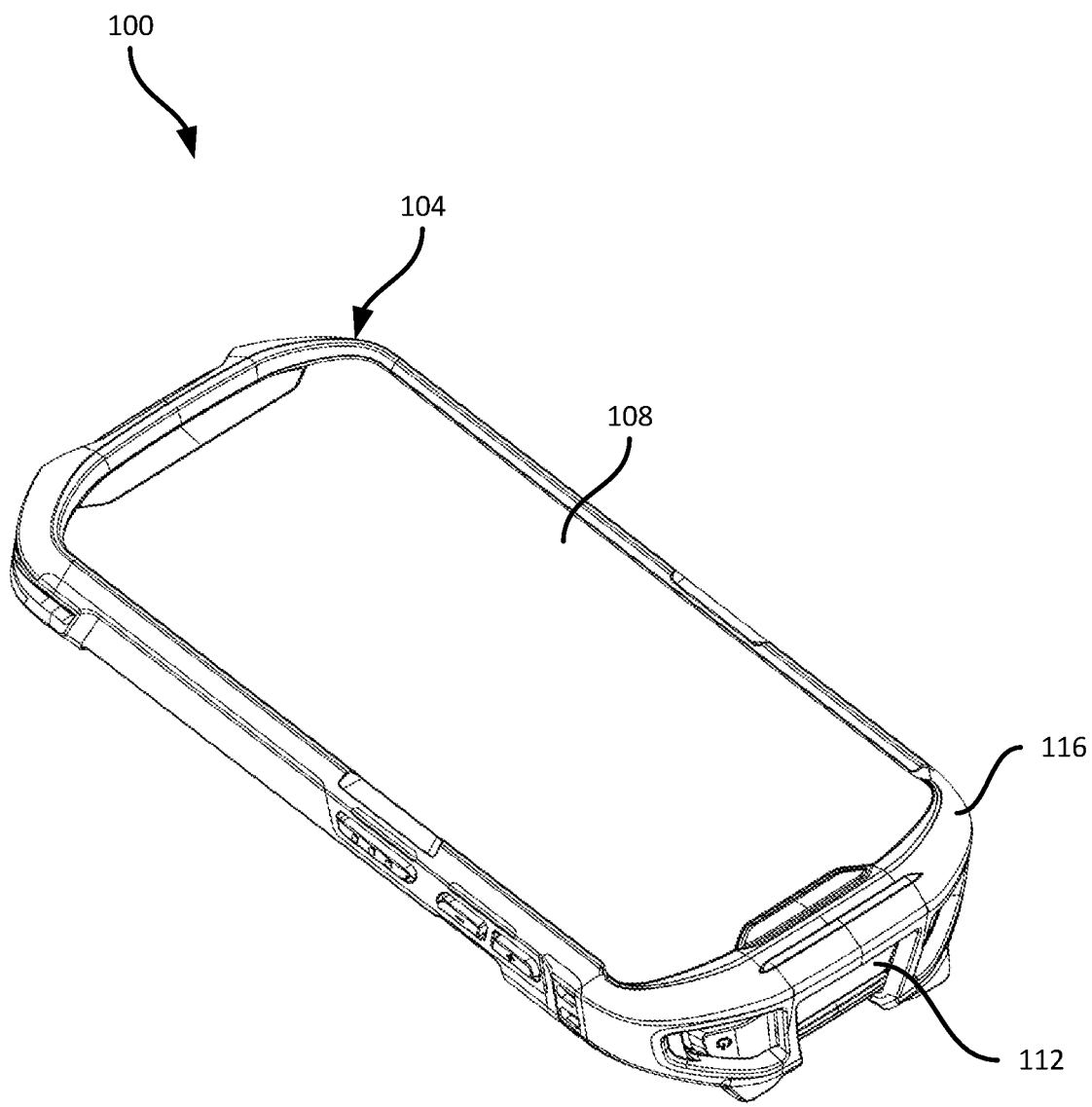
FIG. 1 is a diagram of a mobile computing device viewed from the front.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an accessory for a mobile computing device having a camera with a field of view (FOV), the accessory comprising: an adapter including: an inner wall having a first opening; a retention mechanism configured to releasably retain the mobile computing device against the inner wall with the camera positioned over the first opening; an outer wall joined to the inner wall by a set of side walls, the outer wall having a second opening with a second perimeter larger than a first perimeter of the first opening; a set of channel walls extending between the first perimeter of the first opening and the second perimeter of the second opening, the set of channel walls defining an open channel permitting the camera FOV to traverse the adapter substantially unobstructed; and a handle mount disposed on the outer wall.

FIG. 1 shows a mobile computing device 100, such as a smart phone or other mobile computer. The device 100 includes a housing 104 supporting various other components, including a display 108, which can include an integrated touch screen. The device 100 can also include a barcode scanning module including a upwards-facing scan window 112, and one or more sensors disposed within the housing 104, with fields of view (FOVs) extending out through the scan window 112. The sensors mentioned above can include image sensors, laser scanners, or the like, suitable for capturing and decoding machine-readable indicia such as one-dimensional and two-dimensional barcodes. The device 100 can also include an exoskeleton 116, e.g. a ruggedized case or other member mounted on an exterior of the housing 104 to insulate the housing 104 from impacts.

Figure 2:
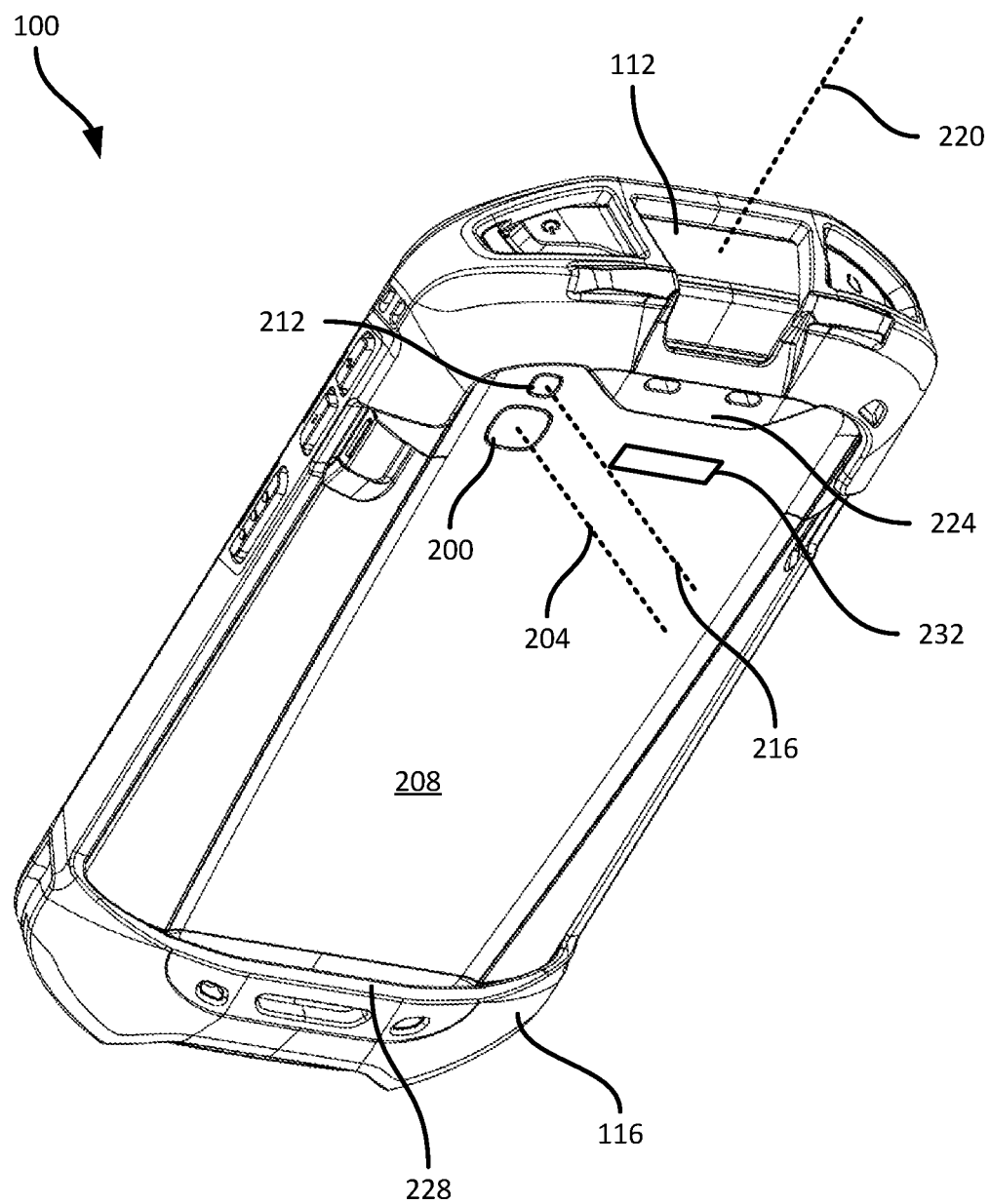
FIG. 2. is a diagram of a mobile computing device viewed from the back.

FIG. 2 illustrates the back of the device 100 (i.e. opposite the display 108). As seen in FIG. 2, the device 100 also includes a camera 200, distinct from the sensor(s) implementing the above-mentioned barcode scanning module. The camera 200 has an FOV centered on an axis 204 that is substantially perpendicular to a back face 208 of the device 100. The axis 204 is therefore also substantially perpendicular to the plane of the display 108 (on the front of the device 100). The device 100 further includes, in the illustrated example, a light emitter 212 such as a light emitting diode (LED) implementing a flash for the camera 200. The emitter 212 is supported on the back 208 of the device 100 adjacent to the camera 200, and has a field of illumination (FOI) centered on an axis 216 that is also substantially perpendicular to the back 208 of the device 108. The axis 216 is therefore substantially parallel to the axis 204. Further, the axes 204 and 216 are substantially perpendicular to an axis 220 of the barcode scanner FOV. Thus, using the barcode scanning module involves directing the top face of the device 100 (which carries the scan window 112) towards the object to be scanned, while using the camera 200 involves directing the back 208 of the device 100 towards the object(s) to be captured.

As also seen in FIG. 2, the exoskeleton 116, or the device housing 104 itself if the exoskeleton 116 is omitted, can include ledges 224 and 228 raised from the back 208, to enable engagement of the housing 104 and/or exoskeleton 116 with a retention mechanism to be discussed below. The back 208 of the device 100 also includes an interface 232, e.g. a set of contacts configured to engage with pogo pins or other suitable electrical connectors.

The device 100 can be deployed in a wide variety of environments, including transport and logistics facilities such as warehouses, manufacturing facilities, and the like. In such environments, the device 100 can be employed as a barcode scanner to capture information from objects handled in the facility in which the device 100 is deployed. To facilitate prolonged use as a barcode scanner, the device 100 can be removably affixed to an accessory that provides a handle enabling an operator to ergonomically aim the top face of the device 100 (and therefore the scan window 112) at an object to be scanned by the barcode scanning module.

Figure 3:
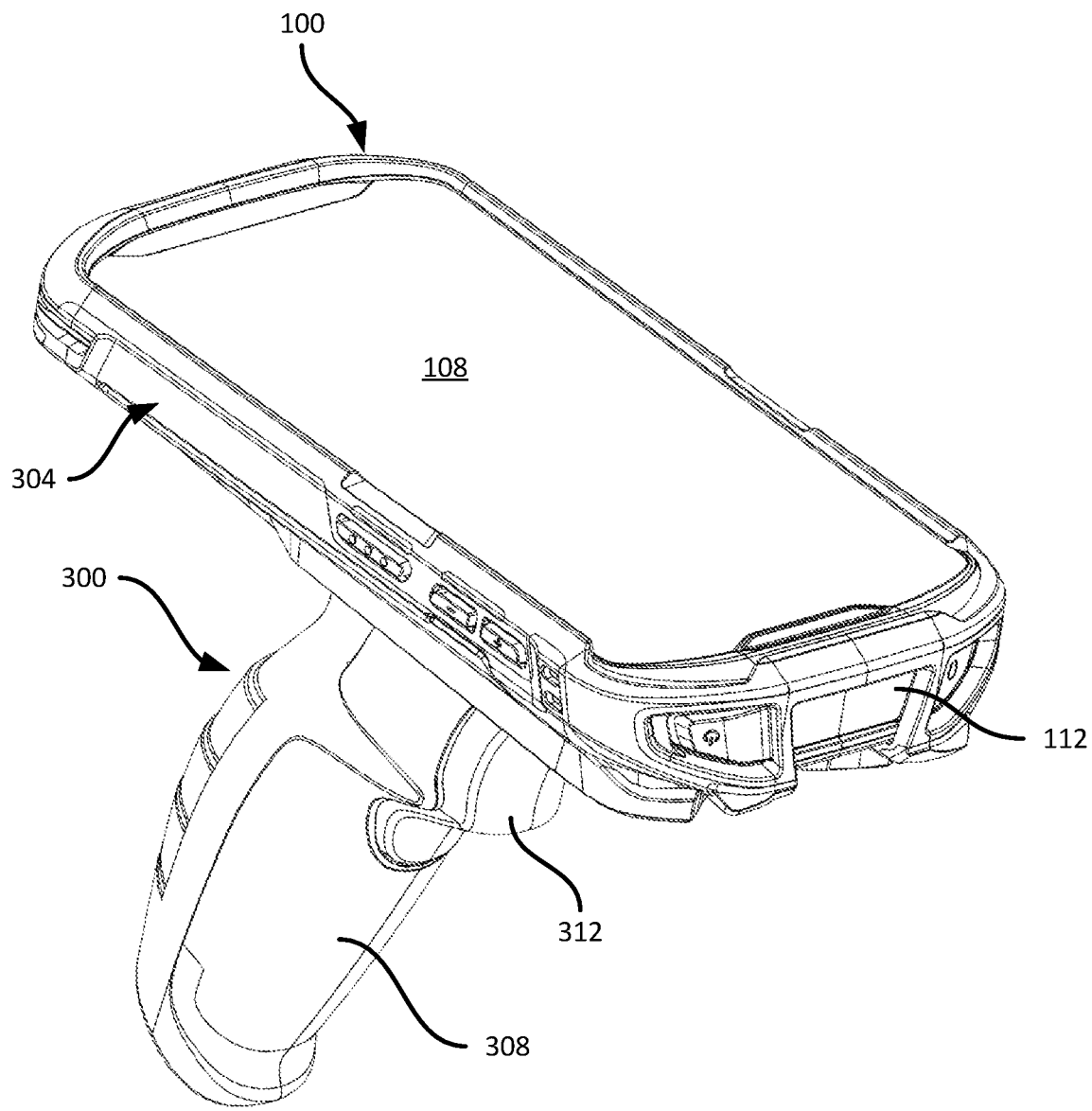
FIG. 3 is a diagram of the mobile computing device of FIG. 1, mounted to an accessory.

FIG. 3 illustrates an accessory 300 as mentioned above. The accessory 300 includes an adapter 304 configured to retain the device 100, and a handle 308 carrying an actuator 312 such as a trigger. The handle 308 can be mounted to the adapter 304, as will be discussed below in greater detail, and the actuator 312 can be electrically connected to the interface 232 of the device 100, enabling communication of signals from the actuator 312 to the device 100. Depression of the actuator 312 can, for example, trigger a scan operation by the barcode scanning module of the device 100.

As will be apparent from FIG. 3, while the front of the device 100, bearing the display 108, is exposed when using the accessory 300, the back 208 of the device faces downwards, towards the accessory 300. As noted above, the camera 200 and the light emitter 212 are disposed on the back of the device 100. To enable use of the camera 200 while the device 100 is affixed to the accessory 300, the accessory 300 includes additional compatibility features, discussed in greater detail below.

Figure 4:
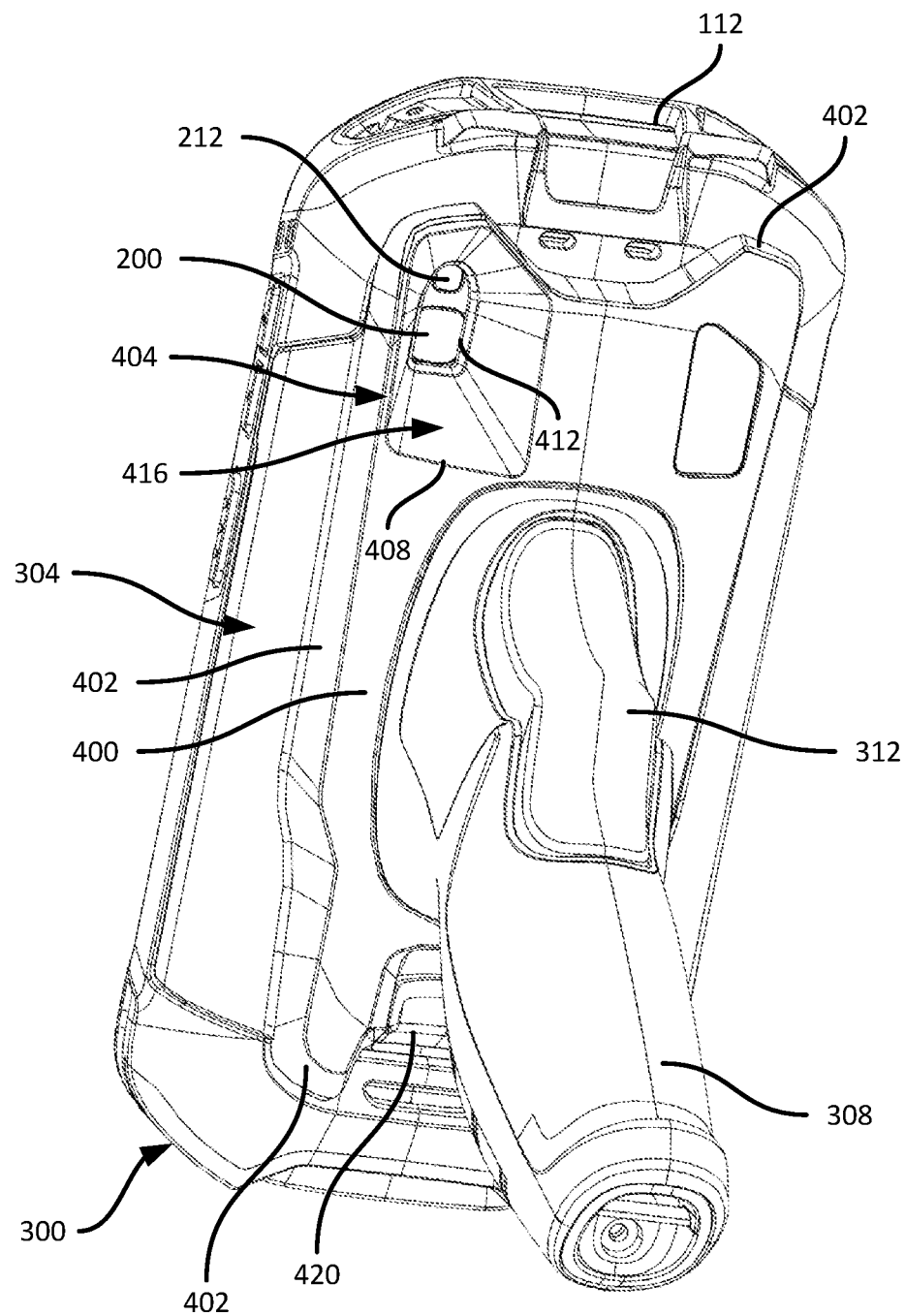
FIG. 4 is a diagram of the mobile computing device and accessory of FIG. 3, viewed from below.

FIG. 4 illustrates a back of the accessory 300. The back of the adapter 304 is formed by an outer wall 400, referred to as "outer" as the wall 400 faces away from the device 100, in contrast to an inner wall of the adapter (not visible in FIG. 4), which faces towards the device 100. The outer wall 400 and the inner wall are joined by a set of side walls 402 to form an interior of the adapter 304, enclosed between the outer wall 400, the inner wall, and the side walls 402.

The outer wall 400 also supports the handle 308. In addition, the adapter 304 includes a channel 404 defined by an opening 408 in the outer wall, a further opening 412 in the inner wall of the adapter 304, and a set 416 of channel walls extending between the outer wall 404 and the above-mentioned inner wall. The set 416 includes at least one channel wall, and may include several walls, dependent on the shape of the openings 408 and 412. In the illustrated example, the channel 404 is defined by a set 416 of five walls. In other examples, a single curved wall can connect the entire perimeters of the openings 408 and 412. Various other configurations of walls defining the channel 404 will also occur to those skilled in the art.

The channel 404, as seen in FIG. 4, is open to expose the camera 200 and the light emitter 212 to the exterior of the adapter 304. The channel 404 therefore enables continued used of the camera 200 even when the device 100 is mounted to the accessory 300. The opening 412 in the inner wall has a perimeter sufficiently large to expose the camera 200 and the light emitter 212 on the back 208 of the device 100. The field of view of the camera 200, and the field of illumination of the light emitter 212, however, expand away from the device 100, and the size of the channel 404 therefore grows from the opening 412 to the opening 408. That is, the perimeter of the opening 408 is larger than the perimeter of the opening 412, such that the FOV of the camera 200 and the FOI of the light emitter 212 are substantially unobstructed by the walls of the channel 404. In the illustrated example, the FOV of the camera 200 is unobstructed, and the FOI of the light emitter 212 is obstructed by less than about 25% of a volume of the FOI falling between the inner wall and outer wall 400 of the adapter 304. In other examples, the FOI is also unobstructed.

Mounting of the device 100 to the accessory 300 (specifically, to the adapter 304) is enabled by the previously mentioned retention mechanism, which releasably retains the device 100 with the back 208 against the inner wall of the adapter 304, placing the camera 200 and the light emitter 212 over the opening 412. The retention mechanism includes a release actuator 420 supported by the outer wall 400, which is slideable to disengage the retention mechanism and permit removal of the device 100 from the accessory 300.

Figure 5:
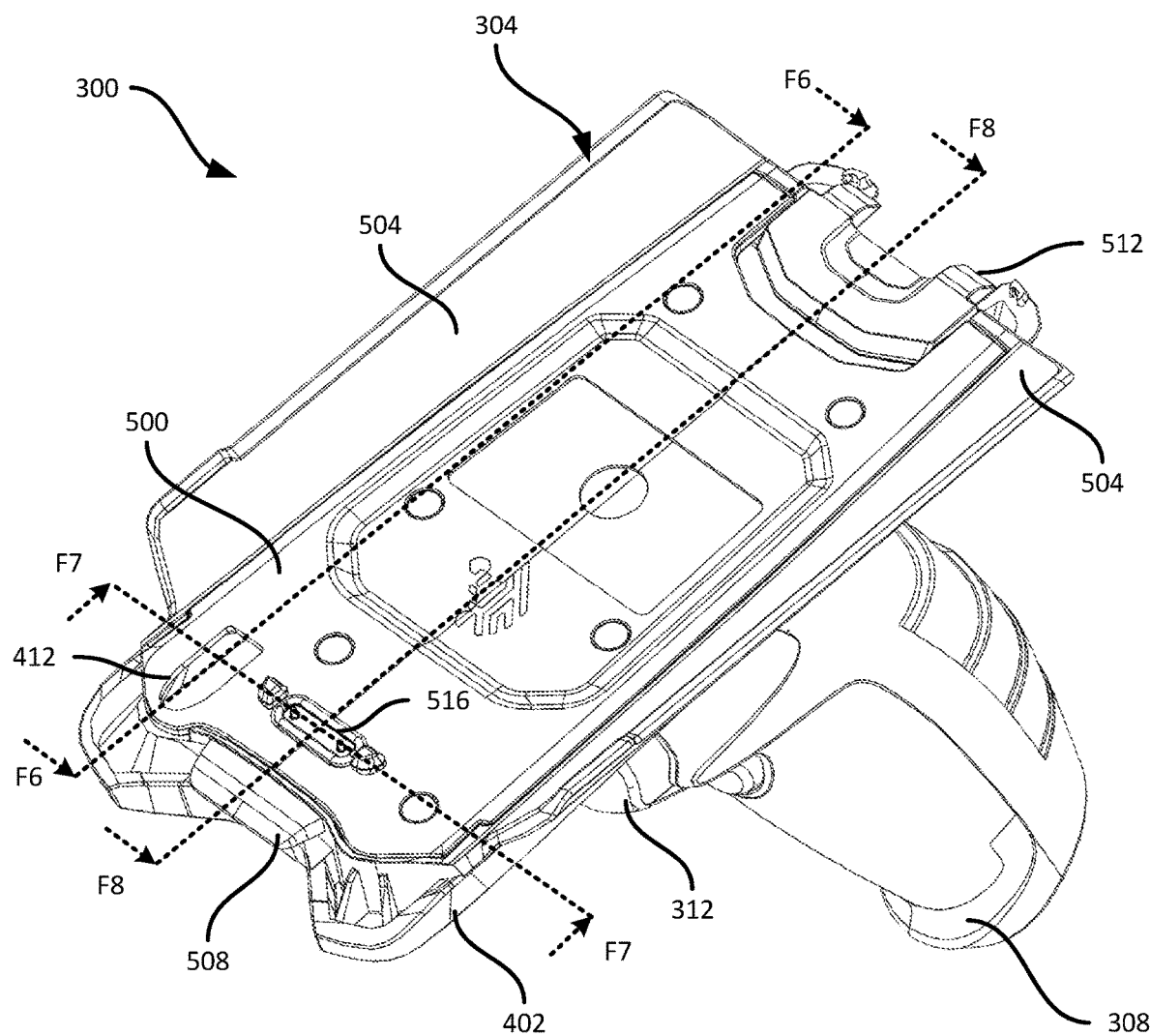
FIG. 5 is a diagram of the accessory of FIG. 3.

Turning to FIG. 5, the accessory 300 is shown in isolation. The above-mentioned inner wall 500 of the adapter 304 is visible in FIG. 5, while the outer wall 400 is not visible. As illustrated, the opening 412 is defined through the inner wall 500 at a location that corresponds to the placement of the camera 200 and light emitter 212, when the device 100 is placed on the adapter 304.

The adapter 304 also includes a pair of opposing wings 504 extending from the side walls 402. The wings 504 engage with sides of the device 100, e.g. to assist the retaining mechanism in affixing the device 100 against the inner wall 500 and reduce or eliminate movement of the device 100 once the device 100 is affixed to the inner wall 500. The retention mechanism itself is also shown in FIG. 5. In particular, the retention mechanism includes a static hook 508 configured to engage with the ledge 224 shown in FIG. 2, as well as a movable latch 512 with a pair of hooks configured to engage with the ledge 228 shown in FIG. 2. The latch 512 is coupled to the release actuator 420, such that manipulation of the release actuator 420 slides both the release actuator 420 and the latch 512 into or out of engagement with the ledge 228. The latch 512 and release actuator 420 can be biased, e.g. by one or more springs disposed in the interior of the adapter 304, towards an extended position (shown in FIG. 5), in which the latch 512 retains the device 100.

The inner wall 500 supports a device interface 516, such as a set of pogo pins or other suitable electrical contacts configured to engage with the interface 232 shown in FIG. 2. The device interface 516 is also connected to the actuator 312 supported by the handle 308, such that signals generated via depression of the actuator 312 are communicated to the device 100 via the interface 516. The connection between the device interface 516 and the actuator 312 can be, for example, a flex cable or other suitable electrically conductive member extending from the device interface 516 to the actuator 312 within the adapter 304.

Figure 6:
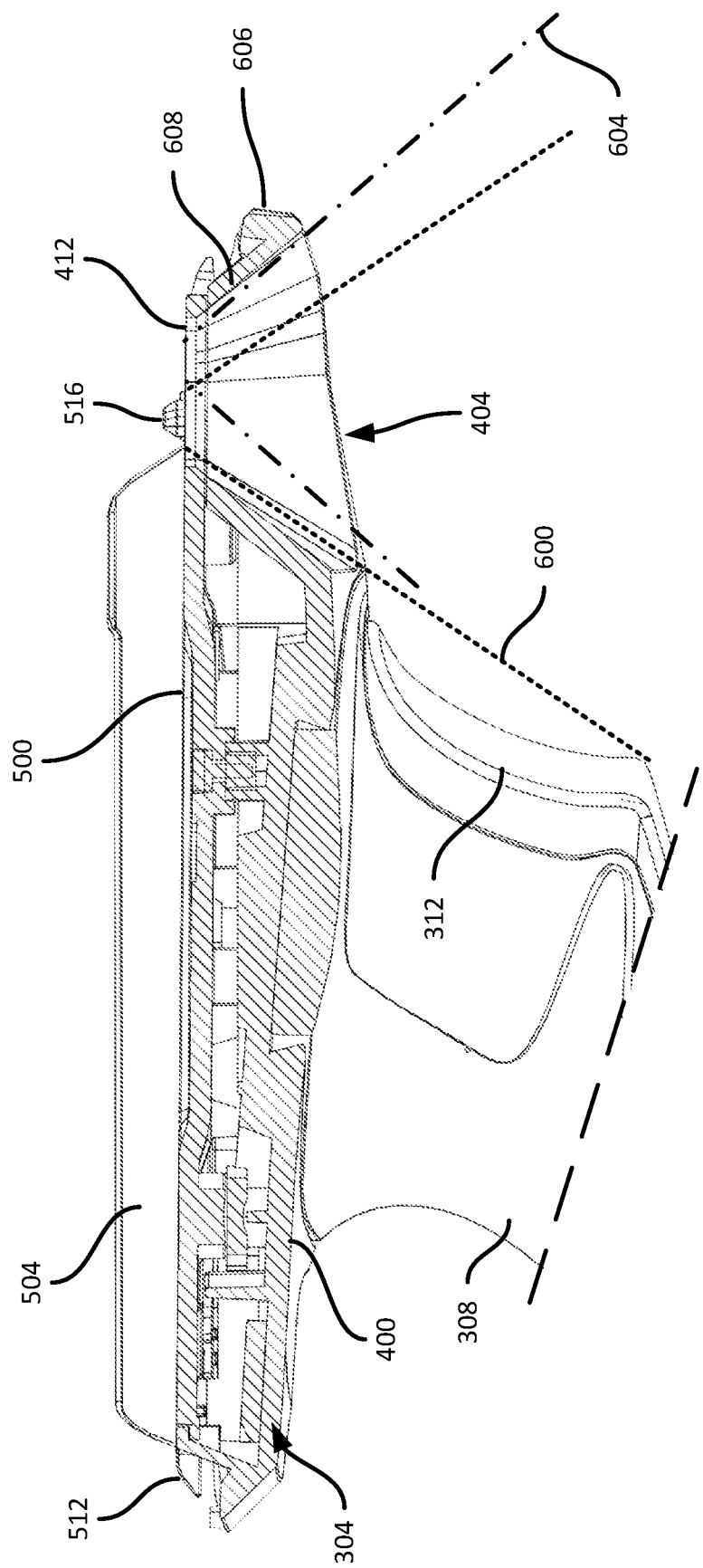
FIG. 6 is a cross section F6 of the accessory of FIG. 5.

Turning to FIG. 6, a cross section F6 as indicated in FIG. 5 is illustrated, showing the channel 404 and set 416 of channel walls in greater detail. As seen in FIG. 6, the walls of the set 416 are angled so as to minimize or eliminate obstruction of the FOV 600 of the camera 200, and the FOI 604 of the light emitter 212. FIG. 6 also shows that the channel 404 is adjacent to a forward end 606 of the adapter 304, which may impose a limit on the degree to which a forward wall 608 of the channel 404 can be angled, while still providing sufficient structural rigidity to the adapter 304. In some examples, the forward wall 608 may therefore obstruct a portion of the FOI 604. The FOV 600 of the camera 200, however, remains unobstructed.

The handle 308 is mounted to the adapter 304 at a position and angle 612 relative to the inner wall 500 so as to reduce or eliminate interference with the FOV 600. As shown in FIG. 6, the FOV 600 does not intersect with the actuator 312 or the handle 308. Mounting of the handle 308 to mitigate obstruction of the camera FOV 600 will be discussed below in greater detail.

Figure 7:
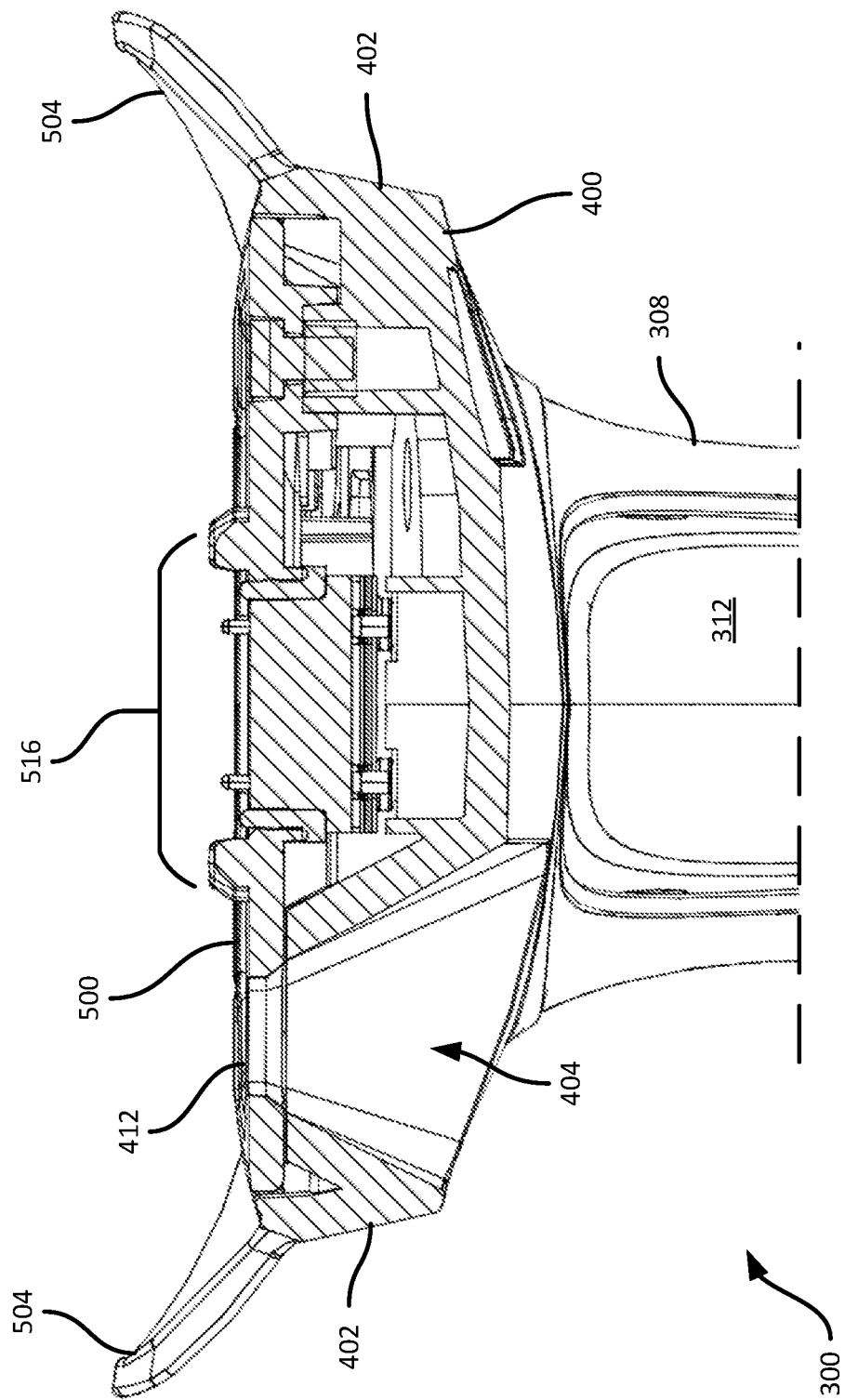
FIG. 7 is a cross section F7 of the accessory of FIG. 5.

FIG. 7 illustrates the cross section F7 of the accessory 300, as indicated in FIG. 5. As shown in FIG. 7, the walls of the set 416 defining the channel 404 are angled to accommodate the FOV of the camera 200 and the FOI of the light emitter 212 (i.e. to reduce or eliminate obstruction of the FOV 600 and the FOI 604).

Figure 8:
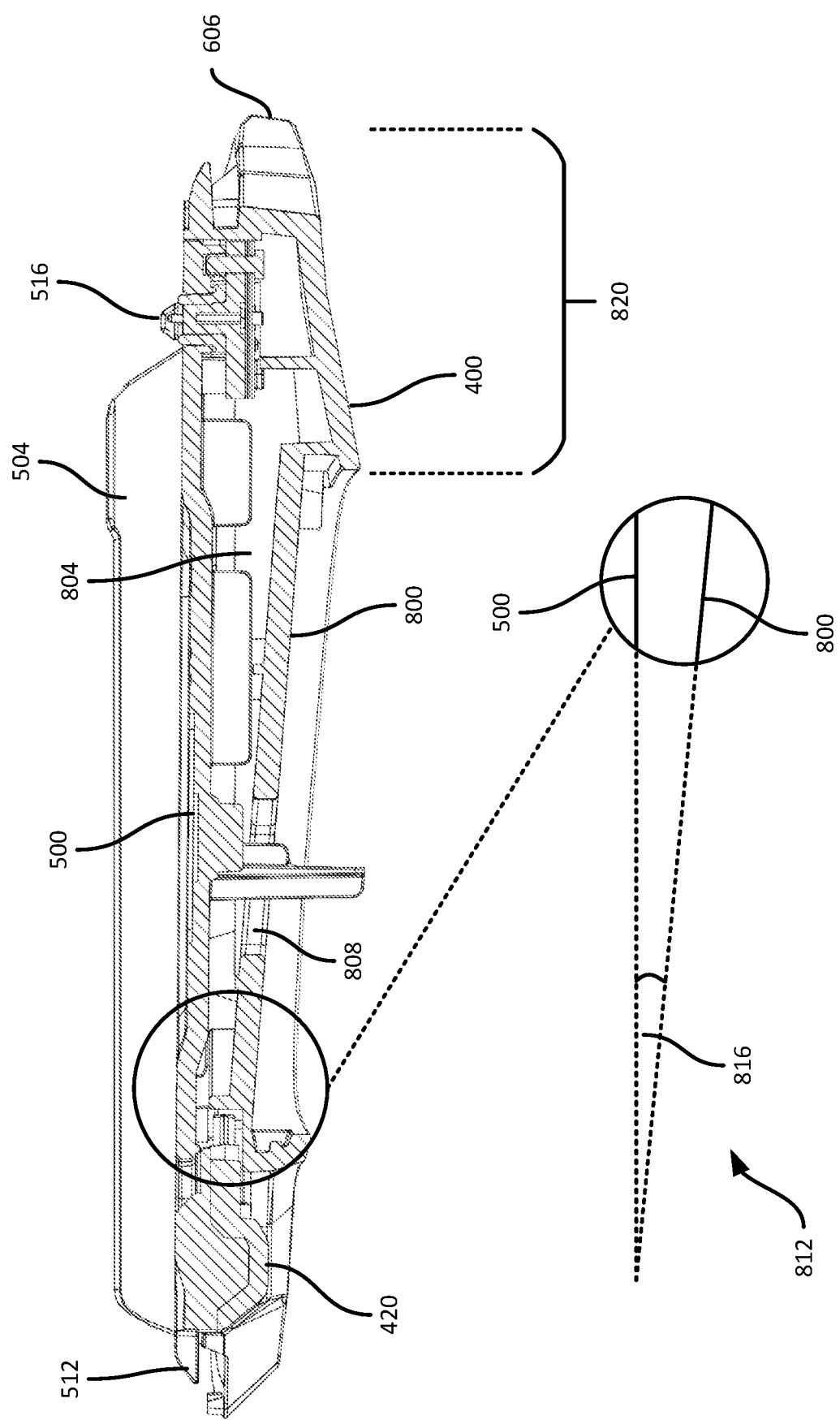
FIG. 8 is a cross section F8 of the accessory of FIG. 5.

FIG. 8 illustrates the cross section F8 of the adapter 300 (with the handle 308 omitted), as indicated in FIG. 5. The outer wall 400 of the adapter 304 includes a handle mount 800, which in this example is a portion of the outer wall 400 inset from the remainder of the outer wall 400 (i.e. recessed into the interior 804 of the adapter 304). The handle 308 can be affixed to the handle mount 800 via screws or other fasteners, e.g. by accessing the interior 804 of the adapter 304. The handle mount 800 also includes, in this example, an opening 808 into the interior 804 of the adapter 304, e.g. to permit passage of an electrical connector between the device interface 516 and the actuator 312 of the handle 308.

The handle mount 800 is substantially planar, and is angled (i.e. non-parallel) relative to the inner wall 500 (and therefore relative to the back 208 of the device 100, when the device 100 is placed on the adapter 304). In particular, as shown in the schematic 812 in the lower portion of FIG. 8, the angle 816 between the inner wall 500 of the adapter 304 and the handle mount 800 is about six degrees. The angle of the handle mount 800 enables the handle 308 to be mounted to the adapter 304 without obstructing the FOV 600 of the camera 200, as mentioned above in connection with FIG. 6. The handle mount 800 may also be spaced from the forward end 606 of the adapter 304 by a distance 820 such that the combination of the angle 816 and the distance 820 mitigate obstruction of the FOV 600 and the FOI 604 by the handle 308 and the actuator 312.

Figure 9:
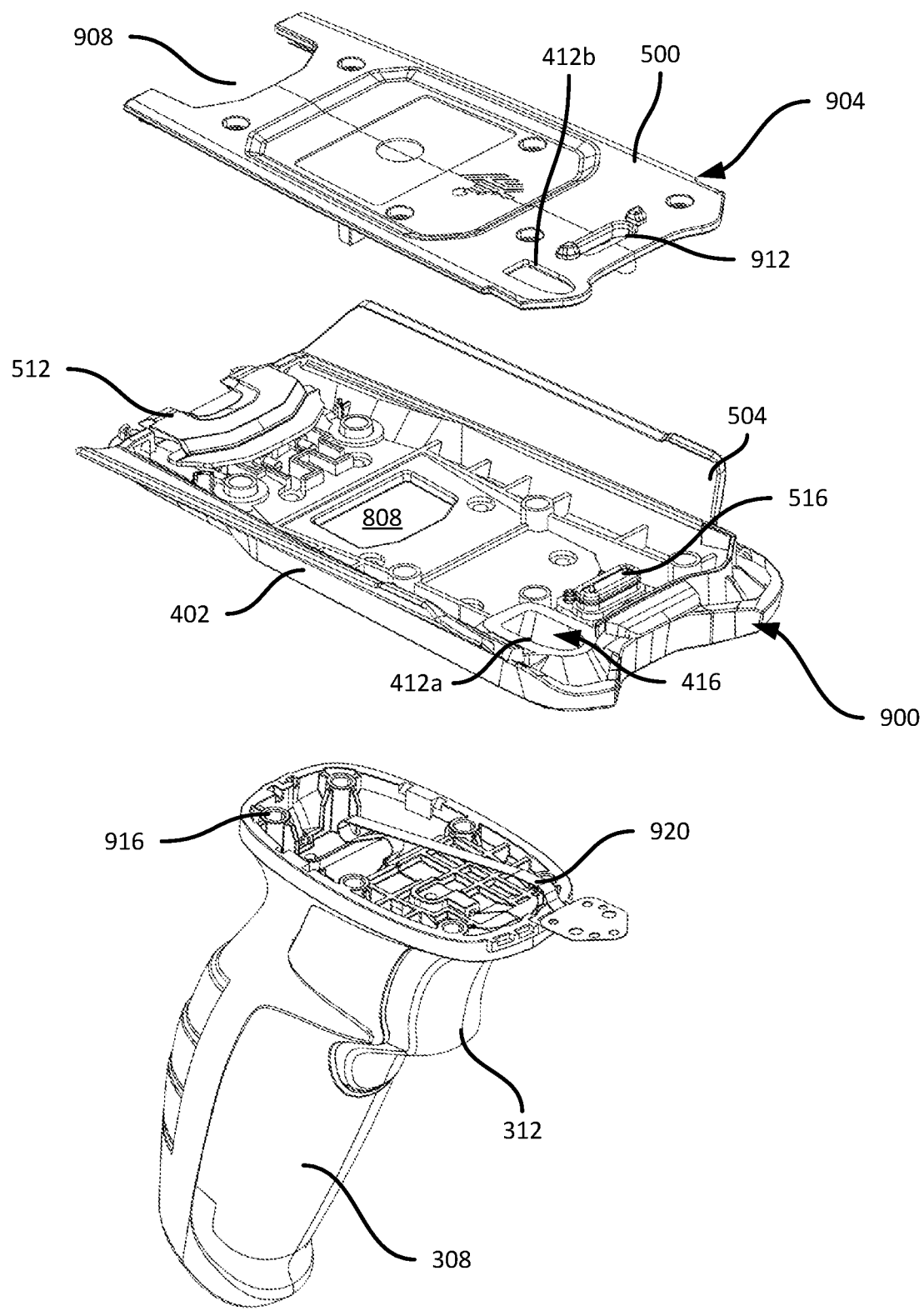
FIG. 9 is an exploded view of the accessory of FIG. 3, viewed from above.
Figure 10:
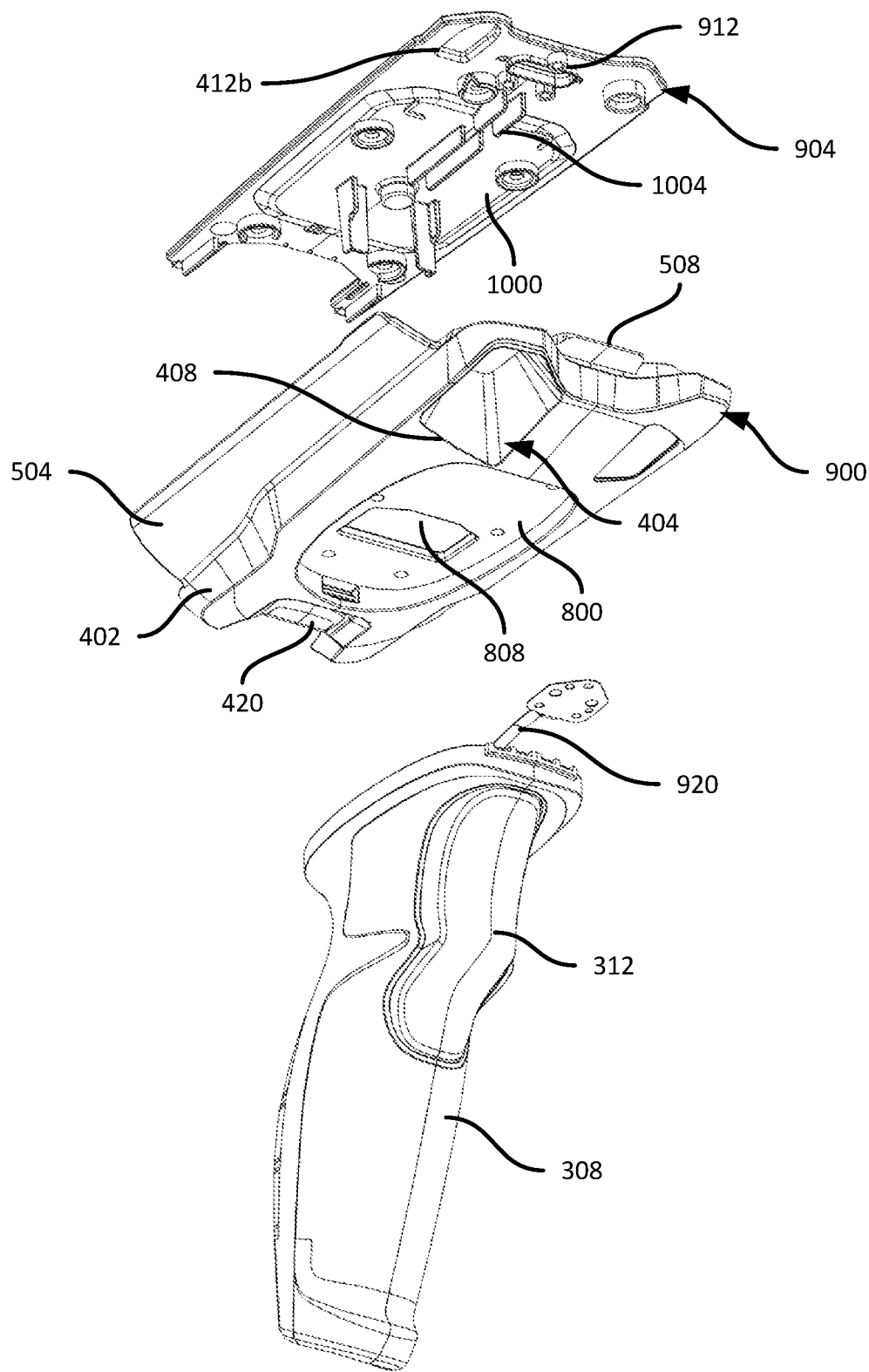
FIG. 10 is an exploded view of the accessory of FIG. 3, viewed from below.

FIG. 9 and FIG. 10 illustrate exploded views of the accessory 300, according to some implementations. In the illustrated example, the adapter 300 includes an adapter base 900, and a cover 904. The cover 904 defines the inner wall 500 of the adapter 304, while the base 900 defines the side walls 402 and the outer wall 400, as well as the handle mount 800 and opening 808. The base 900 also defines the set 416 of channel walls, and the opening 408.

The opening 412 shown in FIGS. 4 and 5, in this example, is defined by both the base 900 and the cover 904. For example, the base 900 can include a first opening 412*a*, while the cover 904 can include a second opening 412*b*. The openings 412*a* and 412*b* can have substantially the same shape and size, and when the cover 904 is placed onto the base 900, form the opening 412 discussed earlier.

The cover 904 also includes, in this example, a cutout 908 to accommodate the latch 512, which is supported by the base 900. In addition, the cover 904 includes an opening 912 to enable passage of the device interface 516, which is supported on the base 900.

To assemble the accessory 300, the handle 308 can be affixed to the base 900, e.g. by applying fasteners such as screws through the base 904 and into apertures 916 in the handle 308. An electrical connector 920 such as a flex cable or the like can be passed through the opening 808 for connection to the device interface 516. In other examples, the connector 920 is affixed to the interface 516, and passed out through the opening 808 towards the handle 308. Once the handle 308 is affixed to the base 900, the cover 904 is affixed to the base 900, e.g. by applying further fasteners through the cover 904 and into corresponding apertures in the base 900.

As shown in FIG. 10, the cover 904 can also include, on a lower surface 1000 thereof, a guide 1004 such as a set of fins extending from the surface 1000. The fins of the guide 1004 can guide the connector 920 from the handle 308 toward the device interface 516, e.g. to prevent unwanted movement of the connector 920 that may result in disconnection from the device interface 516 and/or damage to the connector 920.

Figure 11:
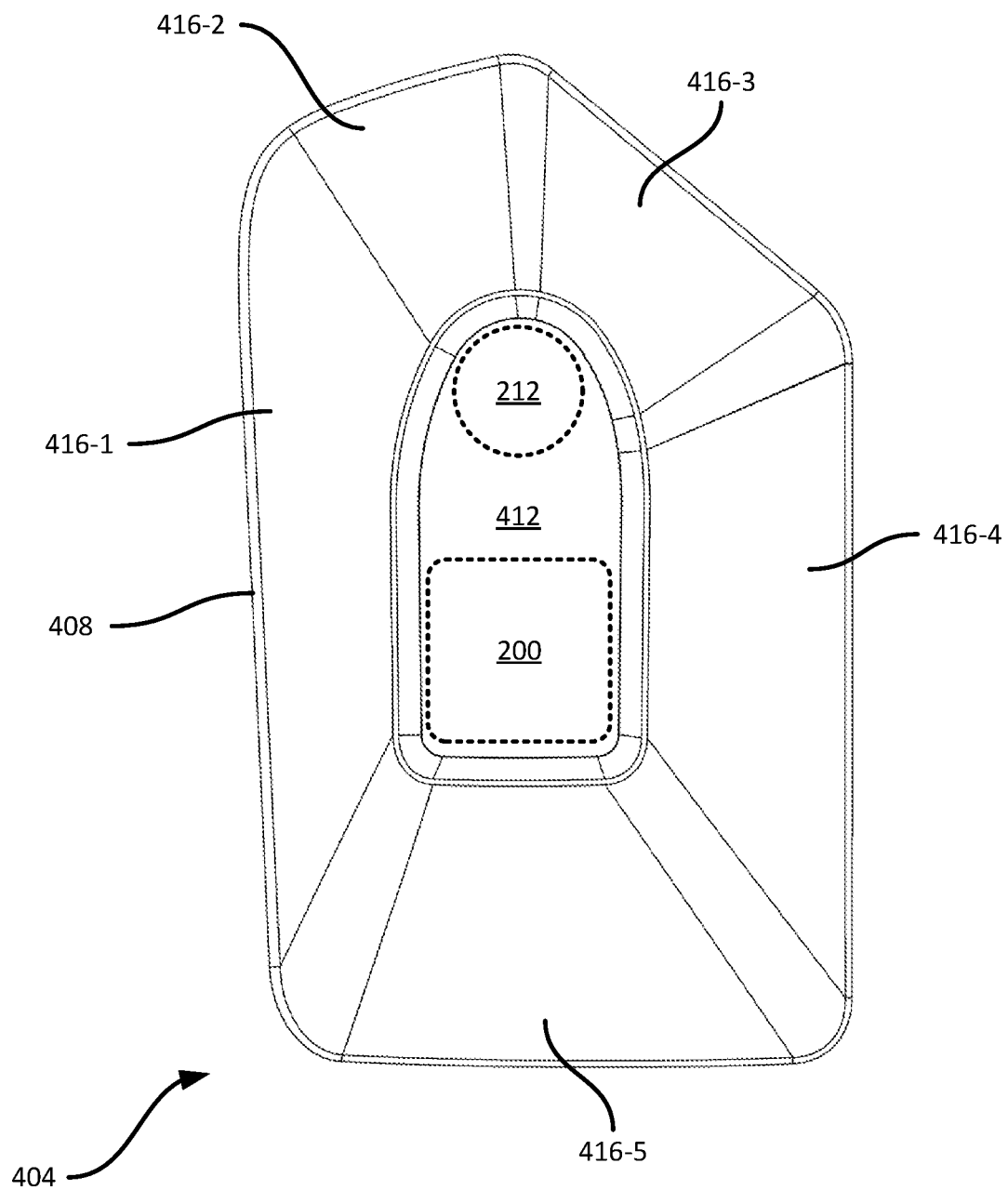
FIG. 11 is a diagram of a channel of the accessory of FIG. 3.

FIG. 11 illustrates the channel 404 in isolation, seen from the outer side of the adapter 304 (i.e. facing the outer wall 400, as in FIG. 4), and with the locations of the light emitter 212 and camera 200 indicated. The set 416 of channel walls are shown in greater detail, including respective walls 416-1, 416-2, 416-3, 416-4, and 416-5. Each wall 416 is a substantially planar wall, and adjacent walls 416 are joined at curved corners. In other examples, the corners between walls 416 need not be curved as shown in FIG. 11. In addition, a variety of configurations of walls 416 can be employed, depending on the shapes and locations of the camera 200 and the light emitter 212, as well as on the configuration of the surrounding portions of the adapter 304.

Some or all of the channel walls 416 can include surface treatments, e.g. to reduce reflections of light emitted by the light 212 directly from a wall 416 back to the camera 200. Such reflections may negatively impact the image quality of images captured by the camera 200. The surface treatments applied to the walls 416 can therefore include anti-reflective treatments. Examples of surface treatments include surface textures, such as a sand-blasted texture (e.g. with a surface roughness that exceeds a threshold), paints or other coatings that suppress reflections, and the like. In some examples, pigments (e.g. black coloring) can be applied to the walls 416 to increase light absorption by the walls 416. Various combinations of the walls 416 can have different surface treatments. For example, the walls 416-2 and 416-3, which may be responsible for a greater portion of reflections than the other walls 416 due to their proximity to the light emitter 212, can include a first surface treatment, while the other walls 416 can include no surface treatment, or a second surface treatment different from the first.

Figure 12:
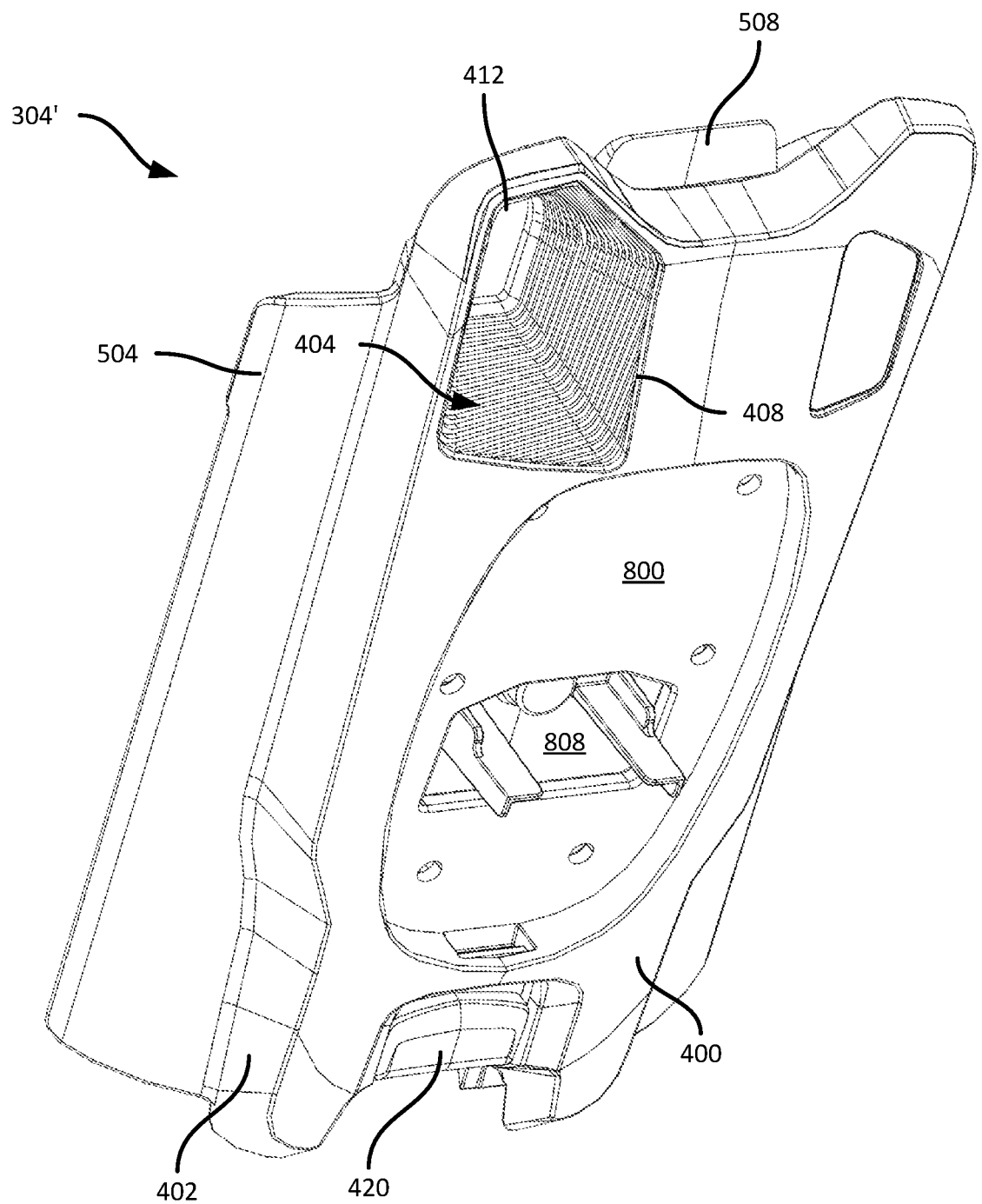
FIG. 12 is a diagram of a variation of the adapter of the accessory of FIG. 3.

Turning to FIG. 12, the surface treatments applied to the walls 416 can include a stepped profile. Specifically, an adapter 304' is illustrated, in which the channel 404 is formed by walls 416 with repeating substantially perpendicular surfaces, which may diffuse light from the light emitter 212 outwards, reducing the amount of such light that is reflected from the walls 416 back to the camera 200.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An accessory for a mobile computing device having a camera with a field of view (FOV), the accessory comprising:
    an adapter including:
        an inner wall having a first opening;
        a retention mechanism configured to releasably retain the mobile computing device against the inner wall with the camera positioned over the first opening;
        an outer wall joined to the inner wall by a set of side walls, the outer wall having a second opening with a second perimeter larger than a first perimeter of the first opening;
        a set of channel walls extending between the first perimeter of the first opening and the second perimeter of the second opening, the set of channel walls defining an open channel permitting the camera FOV to traverse the adapter substantially unobstructed, wherein the set of channel walls are angled away from the camera FOV around the first perimeter; and
        a handle mount disposed on the outer wall.

2. The accessory of claim 1, wherein the retention mechanism is configured to retain a back of the mobile computing device carrying the camera against the inner wall; and
    wherein the inner wall is substantially perpendicular to a central axis of the FOV.

3. The accessory of claim 1, further comprising a handle coupled to the handle mount disposed on the outer wall.

4. The accessory of claim 3, further comprising:
    a device interface on the inner wall, configured to engage with electrical contacts of the mobile computing device; and
    a connector extending from the device interface to an actuator of the handle via an interior of the adapter enclosed by the inner wall, the outer wall, and the side walls.

5. The accessory of claim 4, wherein the handle mount includes a surface angled relative to the inner wall to support the handle outside a volume defined by the FOV.

6. The accessory of claim 1, further comprising:
    a pair of wings extending from opposing ones of the side walls adjacent to the inner wall, to retain the mobile computing device.

7. The accessory of claim 1, wherein the retention mechanism includes a latch at a rear end of the inner wall, including a movable hook configured to engage with a housing of the mobile computing device.

8. The accessory of claim 7, wherein the retention mechanism includes a static forward hook configured to engage with the housing of the mobile computing device.

9. The accessory of claim 1, wherein the first perimeter of the first opening is sized to accommodate the camera and a light emitter disposed on the mobile computing device adjacent to the camera; and
    wherein the channel is configured to permit the camera FOV and a field of illumination (FOI) of the light emitter to traverse the adapter substantially unobstructed.

10. The accessory of claim 1, wherein at least one of the channel walls includes an anti-reflective surface treatment.

11. The accessory of claim 10, wherein the surface treatment includes an anti-reflective coating.

12. The accessory of claim 10, wherein the surface treatment includes a surface texture.

13. The accessory of claim 10, wherein the surface treatment includes a stepped surface profile.

14. The accessory of claim 10, wherein the surface treatment is applied to at least one of the channel walls adjacent to a light emitter disposed on the mobile computing device adjacent to the camera.

15. The accessory of claim 14, wherein the at least one channel wall includes a first surface treatment, and the remaining channel walls include a second surface treatment distinct from the first surface treatment.

16. The accessory of claim 1, wherein the adapter includes a base defining the outer wall and the side walls, and a cover defining the inner wall.

\* \* \* \* \*